US012332727B2

(12) United States Patent
Rennig

(10) Patent No.: US 12,332,727 B2
(45) Date of Patent: *Jun. 17, 2025

(54) DEVICE AND METHOD FOR CHECKING FRAMES FROM A COMMUNICATION BUS

(71) Applicant: STMicroelectronics Application GMBH, Aschheim-Dornach (DE)

(72) Inventor: Fred Rennig, Nandlstadt (DE)

(73) Assignee: STMicroelectronics Application GMBH, Aschheim-Dornach (DE)

( * ) Notice: Subject to any disclaimer, the term of this patent is extended or adjusted under 35 U.S.C. 154(b) by 88 days.

This patent is subject to a terminal disclaimer.

(21) Appl. No.: 18/309,397

(22) Filed: Apr. 28, 2023

(65) Prior Publication Data
US 2023/0269150 A1 Aug. 24, 2023

Related U.S. Application Data

(63) Continuation of application No. 17/182,914, filed on Feb. 23, 2021, now Pat. No. 11,677,648.

(30) Foreign Application Priority Data

Mar. 9, 2020 (IT) ....................... 102020000004978

(51) Int. Cl.
H04L 43/08 (2022.01)
G06F 11/07 (2006.01)
H04L 12/40 (2006.01)

(52) U.S. Cl.
CPC .......... *G06F 11/0739* (2013.01); *H04L 43/08* (2013.01); *H04L 12/40* (2013.01); *H04L 2012/40215* (2013.01)

(58) Field of Classification Search
None
See application file for complete search history.

(56) References Cited

U.S. PATENT DOCUMENTS 9,389,949 B1 7/2016 Campbell
10,678,726 B2 6/2020 Rennig et al.
(Continued)

FOREIGN PATENT DOCUMENTS

CN 106093673 A 11/2016
CN 106123476 A 11/2016
(Continued)

OTHER PUBLICATIONS

Wang, Jinling, "The standardized design and testing of the Dedicated test point based on the CAN-bus node", TN431.2, Oct. 15, 2013, 62 pages.
(Continued)

*Primary Examiner* — The Hy Nguyen
(74) *Attorney, Agent, or Firm* — Slater Matsil, LLP

(57) ABSTRACT

In accordance with an embodiment, a method includes determining whether a frame received from a communication bus is encoded according to a particular communication protocol and is addressed to a particular electronic device; increasing a frame count value when the frame is encoded according to the particular communication protocol and is addressed to the particular electronic device based on the determination, wherein increasing the frame count value comprises increasing a count of a modular arithmetic counter circuit having a first bit depth, and the frame count value is constrained to a modulus value of the modular arithmetic counter circuit; setting a frame count status bit based on comparing the frame count value to threshold values, and transmitting a frame comprising the frame counter status bit over the communication bus, and resetting the frame count value at an end of a monitoring time interval.

20 Claims, 2 Drawing Sheets

(56) References Cited

U.S. PATENT DOCUMENTS

| | | | |
|---|---|---|---|
| 11,677,648 B2 * | 6/2023 | Rennig | G06F 11/0757 |
| | | | 370/241 |
| 2006/0107154 A1 | 5/2006 | Bansal et al. | |
| 2008/0285690 A1 | 11/2008 | Kwon et al. | |
| 2015/0286198 A1 | 10/2015 | Sugeno et al. | |
| 2016/0308887 A1 * | 10/2016 | Jung | H04L 63/1416 |
| 2018/0007076 A1 | 1/2018 | Galula et al. | |
| 2018/0173579 A1 | 6/2018 | Potlapally et al. | |
| 2018/0234248 A1 | 8/2018 | Imamoto et al. | |
| 2019/0294488 A1 | 9/2019 | Marui et al. | |
| 2019/0344088 A1 | 11/2019 | Fishler et al. | |
| 2020/0065175 A1 | 2/2020 | Hoegberg | |
| 2021/0226872 A1 * | 7/2021 | Ujiie | H04W 12/61 |

FOREIGN PATENT DOCUMENTS

| | | |
|---|---|---|
| CN | 106790053 A | 5/2017 |
| CN | 108965082 A | 12/2018 |
| CN | 109309598 A | 2/2019 |
| EP | 3547620 A1 | 10/2019 |
| JP | H10107805 A | 4/1998 |
| WO | 2019122589 A1 | 6/2019 |

OTHER PUBLICATIONS

Khan, Sultan Daud et al., "DISAM: Density Independent and Scale Aware Model for Crowd Counting and Localization", IEEE International Conference on Image Processing (ICIP), Sep. 22-25, 2019, 5 pages.

* cited by examiner

DEVICE AND METHOD FOR CHECKING FRAMES FROM A COMMUNICATION BUS

CROSS-REFERENCE TO RELATED APPLICATIONS

This application is a continuation of U.S. patent application Ser. No. 17/182,914, filed Feb. 23, 2021, which application claims the benefit of Italian Patent No. 102020000004978 filed on Mar. 9, 2020, which applications are hereby incorporated herein by reference in its entirety.

TECHNICAL FIELD

The description relates to communication networks involving functional safety features.

One or more embodiments may find use in automotive networks, e.g., for communication between an electronic control unit (ECU) in a vehicle and one or more corresponding actuator devices and/or sensor devices in the vehicle. Driver circuits for LED lighting modules (e.g., front, rear, interior lights) are exemplary of such devices.

BACKGROUND

Data communication in safety-critical systems such as, for instance, certain automotive communication networks may be subject to certain functional safety requirements. For instance, operation of an automotive communication network may involve detecting faults according to the specification described in ISO 26262-6:2018, Appendix D 2.4.

To this regard, automotive communication networks of known types may implement functional safety features such as cyclic redundancy check (CRC), device addressing and frame counting.

In particular, frame counting may involve counting the number of frames validly received during a certain time interval at a certain device (e.g., a transceiver) in the communication network, and comparing that number to a number of frames which is expected to be received at that device during that time interval. In other words, a communication network may be designed to detect mismatches between the number of frames sent over the network and the number of frames received over the network in order to detect loss of data and/or insertion of data.

Communication networks known in the art may implement such a frame counting feature in software, i.e., by means of software code running on a processing unit (e.g., a microcontroller) in an electronic control unit coupled to the network. While such a software implementation may provide a certain degree of flexibility and may allow counting a total number of frames exchanged over the network, it may turn out to be inefficient in connection with some applications, and/or costly.

SUMMARY

In accordance with an embodiment, an electronic device is configured to be coupled to a communication bus to receive therefrom digital signals arranged in frames comprising frames encoded according to a particular communication protocol. The electronic device includes: a check circuit sensitive to the digital signals arranged in frames, the check circuit configured to determine whether a received frame is encoded according to the communication protocol and is addressed to the electronic device; a frame counter circuit coupled to the check circuit and configured to produce a frame count value that is a function of a number of frames received during a monitoring time interval, and to increase the frame count value as a result of a positive outcome of the determination by the check circuit, wherein the frame counter circuit comprises a modular arithmetic counter circuit having a certain bit depth, and wherein the frame count value is constrained to a modulus value of the modular arithmetic counter circuit; a comparator circuit configured to: compare the frame count value against a first frame count threshold value and, as a result of the frame count value being equal to the first frame count threshold value, set a frame counter status bit to a first value indicative of a first operating status of the electronic device, and compare the frame count value against a second frame count threshold value different from the first frame count threshold value and, as a result of the frame count value being equal to the second frame count threshold value, set the frame counter status bit to a second value indicative of a second operating status of the electronic device; and a controller circuit configured to transmit over the communication bus a frame comprising the frame counter status bit, and to reset the frame count value at an end of the monitoring time interval.

In accordance with another embodiment, an integrated circuit includes: a receiver configured to be coupled to a communication bus, and to receive a digital signal arranged in frames encoded according to a particular communication protocol; a check circuit coupled to the receiver, the check circuit configured to determine whether a frame received by the receiver is encoded according to the particular communication protocol and is addressed to a particular electronic device; a frame counter circuit coupled to the check circuit, the frame counter circuit configured to increase a frame count value when the check circuit indicates the frame is encoded according to the particular communication protocol and is addressed to the particular electronic device, wherein the frame counter circuit comprises a modular arithmetic counter circuit having a first bit depth, and the frame count value is constrained to a modulus value of the modular arithmetic counter circuit; a comparator circuit configured to: compare the frame count value to a first frame count threshold value, set a frame counter status bit to a first value indicative of a first operating status of the particular electronic device when the frame count value is equal to the first frame count threshold value, compare the frame count value to a second frame count threshold value different from the first frame count threshold value, set the frame counter status bit to a second value indicative of a second operating status of the particular electronic device when the frame count value is equal to the second frame count threshold value; and a controller circuit configured to transmit a frame comprising the frame counter status bit over the communication bus, and to reset the frame count value at an end of a monitoring time interval.

In accordance with a further embodiment, a method includes: determining whether a frame received from a communication bus is encoded according to a particular communication protocol and is addressed to a particular electronic device; increasing a frame count value when the frame is encoded according to the particular communication protocol and is addressed to the particular electronic device based on the determination, wherein increasing the frame count value comprises increasing a count of a modular arithmetic counter circuit having a first bit depth, and the frame count value is constrained to a modulus value of the modular arithmetic counter circuit; comparing the frame count value to a first frame count threshold value; setting a frame counter status bit to a first value indicative of a first operating status of the particular electronic device when the frame count value is equal to the first frame count threshold value; comparing the frame count value to a second frame count threshold value different from the first threshold value; setting the frame counter status bit to a second value indicative of a second operating status of the particular electronic device when the frame count value is equal to the second frame count threshold value; and transmitting a frame comprising the frame counter status bit over the communication bus, and resetting the frame count value at an end of a monitoring time interval.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

Figure 1:
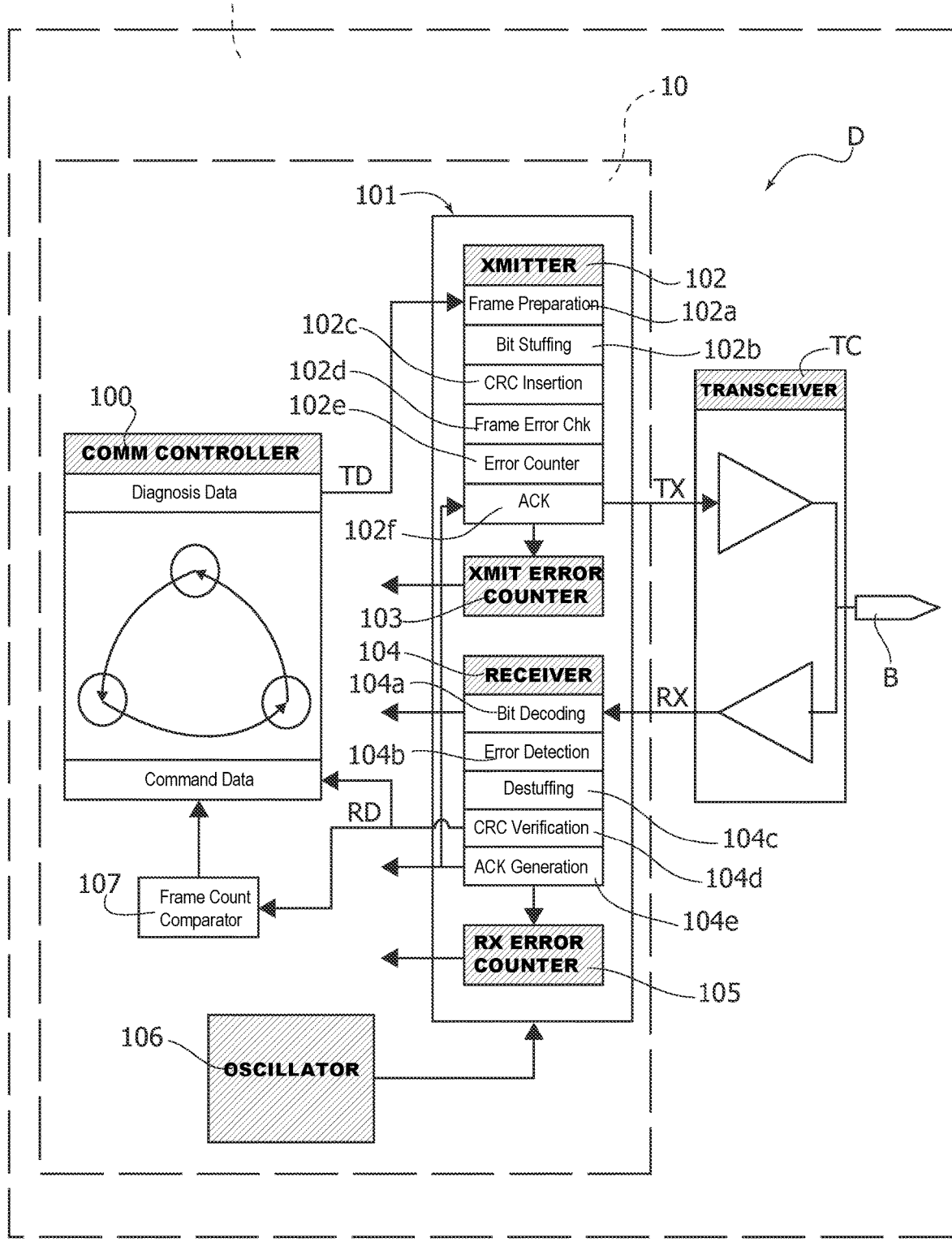
FIG. 1 is a block diagram exemplary of one or more embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

Some embodiments of the present invention are directed to communication networks involving functional safety features. One or more embodiments may relate to a corresponding system; and one or more embodiments may relate to a corresponding vehicle. One or more embodiments may find use in automotive networks, e.g., for communication between an electronic control unit (ECU) in a vehicle and one or more corresponding actuator devices and/or sensor devices in the vehicle. Driver circuits for LED lighting modules (e.g., front, rear, interior lights) are exemplary of such devices.

According to one or more embodiments, an electronic device is provided, the electronic device being configured for coupling to a communication bus to receive therefrom digital signals arranged in frames comprising frames encoded according to a certain communication protocol.

The electronic device may comprise a check circuit sensitive to the digital signals arranged in frames, the check circuit configured to perform a check as to whether a received frame is encoded according to the communication protocol and is addressed to the electronic device.

The electronic device may comprise a frame counter circuit configured to produce a frame count value which is a function of a number of frames received during a monitoring time interval, the frame counter circuit coupled to the check circuit and configured to increase the frame count value as a result of a positive outcome of the check.

The electronic device may comprise a comparator circuit configured to:
  compare the frame count value against a first frame count threshold value and, as a result of the frame count value being equal to the first frame count threshold value, set a frame counter status bit to a first value indicative of a first (e.g., normal) operating status of the electronic device, and
  compare the frame count value against a second frame count threshold value different from the first frame count threshold value and, as a result of the frame count value being equal to the second frame count threshold value, set the frame counter status bit to a second value indicative of a second (e.g., abnormal) operating status of the electronic device.

The electronic device may comprise a controller circuit configured to transmit over the communication bus a frame comprising the frame counter status bit and to reset the frame count value at the end of the monitoring time interval. In some embodiments, the controller circuit is further configured to reset the frame counter status bit at the end of the monitoring time interval.

In one or more embodiments, the frame counter circuit may comprise a modular arithmetic counter circuit having a certain bit depth, and the frame count value may be constrained to a modulus value of the modular arithmetic counter circuit.

Advantages of some embodiments include the ability to provide a frame counter circuit having a low silicon footprint and reduced complexity.

By way of introduction to the detailed description of exemplary embodiments, reference may be had to FIG. 1, which is exemplary of certain components of a device D according to one or more embodiments.

The device D may be configured as a slave or "satellite" device for use in a communication network (e.g., an automotive bus network). For instance, the device D may implement a driver circuit for a LED lighting module in a vehicle. Thus, the device D may receive data frames from a master device (e.g., an ECU in the vehicle, not visible in FIG. 1) for controlling operation (e.g., activation and deactivation) of the respective LED lighting module.

The device D may comprise a transceiver circuit TC configured for coupling to a communication bus B to exchange data frames over the bus. The communication bus B may comprise, for instance, a Controller Area Network (CAN) bus.

The device D may comprise a controller circuit 10 which manages communication (i.e., frame exchange) over the bus B. The controller circuit 10 may be implemented by means of application-specific hardware (ASIC) to reduce the demand for embedded processors for running software, and may be configured to implement a specific communication protocol. For instance, the controller circuit 10 may be configured to exchange, over the bus B, frames encoded according to the format CAN Flexible Data Rate (FD), where the bus B operates according to a master-slave architecture.

Therefore, a controller circuit 10 as exemplified in FIG. 1 may include: a communication controller wo, a protocol controller 101, in turn comprising a transmitter circuit 102, a Transmit Error Counter (TEC) circuit 103, a receiver circuit 104 and a Receive Error Counter (REC) circuit 105, and an oscillator 106, optionally of a voltage, process and temperature compensated type and/or correspondingly trimmed.

In one or more embodiments, the transmitter circuit 102 and the receiver circuit 104 may be configured to cooperate with the transceiver circuit TC (e.g., a CAN FD transceiver circuit) for communicating over the bus B with other devices coupled thereto. For instance, the communication controller wo may send output data TD to the protocol controller 101, which may process the output data TD to generate a corresponding encoded transmission signal TX which is transmitted over the bus B by the transceiver circuit TC. Similarly, the protocol controller 101 may receive an encoded reception signal RX from the bus B through the transceiver circuit TC, and may process the encoded reception signal RX to generate corresponding input data RD which are sent to the communication controller wo.

In one or more embodiments, the transmitter circuit 102 may be configured to perform frame preparation (102*a*), bit stuffing (102*b*), CRC insertion (102*c*), frame error check (102*d*), error counting (102*e*) and acknowledge (102*f*).

In one or more embodiments, the receiver circuit 104 may be configured to perform bit decoding (sampling—104*a*), error detection (104*b*), bit destuffing (104*c*), CRC verification (104*d*) and acknowledge generation (104*e*).

European Patent Application EP 3 547 620 A1 is exemplary of previous activity in this field, which makes it unnecessary providing a more detailed description herein.

It is noted that the occurrence of faults in safety-critical communication systems may result in loss of frames which may lead to safety hazards. For instance, if the communication bus B is used in an automotive lighting system, loss of one or more frames may result in the lights (e.g., the brake lights) failing to properly activate (e.g., turn on) when commanded to do so. According to another example, the communication bus B may be used for collecting data from one or more sensors in the vehicle, so that loss of one or more frames may result in loss of data from the sensors.

Such loss of frames may be due, for instance, to occasional distortion of communication and/or jitter in frame transmission.

Therefore, one or more embodiments may aim at detecting mismatches between a number of frames which is expected to be received at a certain device D during a certain monitoring time interval, and a number of frames which is actually received at the device D during that monitoring time interval.

In particular, since the communication controller 100 and the protocol controller 101 may be monolithically integrated into device D (e.g., into the controller circuit 10), a hardware implementation of a frame counter circuit within the device D may be desired.

A first possible solution may involve implementing a so-called "straightforward" counter circuit within the controller circuit 10. The straightforward counter circuit may be configured to count the total number of frames received at the device D during a monitoring interval and compare it to an expected total number of frames.

The inventor noted that the number of frames received in a monitoring interval may be fairly high. Purely by way of example, a monitoring interval may last about 10 ms, 50 ms, 100 ms, 150 ms, or other multiples of 10 ms, and the corresponding number of received frames may be approximately equal to 15, 75, 150, 225 (again, these values are provided purely by way of non-limiting examples).

Therefore, a solution involving a straightforward counter may turn out to be demanding in terms of resources, insofar as a high number of received frames would involve implementation of a large counter in the receiving device.

Thus, one or more embodiments may aim at detecting a mismatch between the expected number and actual number of frames received at the device D, without the need of keeping track of the total number of frames received during a monitoring interval. As a consequence, the complexity of the frame counter circuit and its occupation of silicon area may be reduced.

Since a certain number of frames may get corrupted or may be lost (and possibly resent) or may be subject to communication jitter which causes a frame to be received earlier or later than expected, without compromising the safety of the system (i.e., without losing the communication integrity), one or more embodiments may be configured to undertake countermeasures after comparing the number of received frames to one or more threshold values. In other words, a certain tolerance margin may be set, so that the device D may react as a result of the number of received frames being outside of a certain accepted range around the expected number of frames. Optionally, the threshold values may be programmable.

A device D as exemplified in FIG. 1, which may comprise a communication controller 100 and a protocol controller 101 fully integrated in the controller circuit 10, may involve an integrated (i.e., hardware implemented) frame counter circuit 107 configured to: update a counter value at each valid frame RD received at device D over a certain monitoring interval, compare the counter value to one or more reference values (or thresholds), detect a frame count mismatch indicative of possible communication failure as a function of the comparison, and upon expiration of the monitoring interval, react accordingly to the detection of a communication failure.

One or more embodiments may advantageously provide a frame counter circuit 107 having a low hardware complexity, thereby resulting in a cost effective solution.

In one or more embodiments, the frame counter circuit 107 may be configured to compare the number of received frames to one or more adjustable thresholds, even on a large amount of frames received within a counting period.

In particular, one or more embodiments may rely on the recognition that in real network implementations the difference between received and expected frames may be rather small if compared to the total number of frames exchanged during the monitoring time interval, which makes it unnecessary to count the total (absolute) number of frames received during the monitoring time interval. Instead, modular arithmetic may be resorted to for efficient frame counting.

For instance, a certain number $f_E$ of frames may be expected to be received at the device D during a certain monitoring interval. Based on the functional safety goals of the specific application, the designer of the communication network may thus define the following parameters:

$$f_H = f_E + m_H;$$

$$f_L = f_E - m_L;$$

$t_H = f_E + s_H;$ $t_L = f_E + s_L;$ wherein $f_H$ is a number of received frames above which a failure of communication is deemed to have happened ($m_H$ being an acceptable upper error margin), $f_L$ is a number of received frames below which a failure of communication is deemed to have happened ($m_L$ being an acceptable lower error margin), $t_H$ is a maximum number of frames which can be reasonably received at device D during the monitoring interval, and $t_L$ is a minimum number of frames which can be reasonably received at device D during the monitoring interval.

Purely by way of example, one may consider the following values:

$f_E$=150 frames;
$f_H$=152 frames;
$f_L$=148 frames;
$t_H$=153 frames;
$t_L$=147 frames.

Still by way of example, by resorting to modulo-16 counting (possibly implemented by means of a simple 4-bit up-counter circuit), the above values may be written as:

$f_E$=6 (mod 16);
$f_H$=8 (mod 16);
$f_L$=4 (mod 16);
$t_H$=9 (mod 16);
$t_L$=3 (mod 16).

Therefore, one or more embodiments may rely on comparing the number of frames $f_A$ (mod i) actually received during a monitoring interval to a lower threshold $f_L$ and/or an upper threshold $f_H$ in order to determine whether the number of received frames is within an acceptable range or not.

The Inventor noted that if $f_E$ (mod i) is close to zero (e.g., equal to 0 or 1) or close to i (e.g., equal to i−1), then $f_H$ (mod i) and $t_H$ (mod i) may happen to be lower than $f_L$ (mod i) and $t_L$ (mod i). Therefore, the designer of the communication network may select the value of i (e.g., by selecting the number of bits of the counter circuit), and/or the duration of the monitoring time interval, so to result in $f_E$ (mod i) being sufficiently removed from the extreme values zero and i (e.g., $1 < f_E$ (mod i) $< i-1$), thereby providing correct operation of the counter circuit under the condition $t_H$ (mod i) $> t_L$ (mod i).

The comparison described above may provide accurate detection of failures as long as the difference between the number of frames actually received $f_A$ and the number of expected frames $f_E$ is lower than i. In one or more embodiments, such a condition may be assumed to be met, at least insofar as the communication network may comprise additional safety features which are able to detect mismatches between the number of sent and received frames exceeding the value i.

In one or more embodiments, the duration of the monitoring interval may be determined during a design phase of the device D, depending on the application requirements.

Alternatively, in one or more embodiments the duration of the monitoring interval may be programmable, possibly on the fly (e.g., the frame counter circuit 107 may be programmed by means of a dedicated programming frame received over the bus B).

In one or more embodiments, the duration of the monitoring interval may be determined as a function of a watchdog trigger. In particular, a watchdog bit may be stored in a local register within the device D, and the value of the watchdog bit may be toggled at regular time intervals (i.e., periodically). The device D may comprise a watchdog event counter (e.g., a 3-bit counter) which counts the number of toggle events of the watchdog bit. In one or more embodiments, the monitoring interval may terminate as a result of the watchdog event counter reaching a certain threshold value (e.g., five toggle events, three toggle events, or even one toggle event). Thus, the frame counter circuit 107 may be configured to adopt as monitoring interval the time interval between two consecutive watchdog toggle events, or between every second toggle event, or between every third watchdog toggle event, and so on.

In one or more embodiments, the number of consecutive watchdog toggle events defining a monitoring time interval may be determined during a design phase of the device D, depending on the application requirements.

Alternatively, in one or more embodiments the number of consecutive watchdog toggle events defining a monitoring time interval may be programmable, possibly on the fly (e.g., the frame counter circuit 107 may be programmed by means of a dedicated programming frame received over the bus B). Thus, the watchdog event threshold value may be stored in a register which is readable and writable by bus access. Flexible operation of the frame counter circuit 107 may thus be provided, insofar as the number of expected frames between two consecutive watchdog toggle events may not be constant, but may be constant, e.g., between five consecutive watchdog toggle events.

The value of the watchdog bit may be toggled at regular time intervals resorting to various arrangements. For instance, in one or more embodiments the watchdog bit may toggle regularly as driven by the internal oscillator 106 of the controller circuit 10. Additionally or alternatively, the watchdog bit may toggle as a result of a signal received at the device D via the bus B. For instance, the watchdog bit may toggle upon reception of a watchdog frame which is periodically sent over the bus B and received at the device D.

In one or more embodiments, the values of the upper threshold $f_H$ and of the lower threshold $f_L$ may be determined during a design phase of the device D, depending on the application requirements.

Alternatively, in one or more embodiments the values of the upper threshold $f_H$ and of the lower threshold $f_L$ may be programmable, possibly on the fly. Programming the values of the thresholds $f_H$ and $f_L$ may be useful, for instance, for adapting to different duration of the monitoring time interval, and/or to different applications having different safety requirements. Thus, the upper threshold $f_H$ and the lower threshold $f_L$ may be stored in registers which are readable and writable by bus access.

In one or more embodiments, the frame counter circuit 107 may be reset at the end of each monitoring interval. In some embodiments, reset may be performed (only) at the end of the prescribed monitoring interval, thereby increasing the functional safety at the cost of reduced flexibility of operation. Optionally, arbitrary reset may be performed as a function of a reset signal received at device D from an arbitrary source (e.g., a master device coupled to the bus B).

Therefore, in one or more embodiments the frame counter circuit 107 may comprise an N-bit up-counter which updates an internal counter value at each valid frame received at the device D. When the N-bit up-counter reaches its maximum value (i.e., $2^N-1$), it overflows (i.e., it starts counting again from zero) without the need of keeping track of a carry bit.

In general, the N-bit up-counter may have a bit depth lower than the bit depth which would be implemented to count the total number of frames received during a monitoring time interval. For instance, if a number j of frames is expected to be received at the device D over a monitoring time interval, a "straightforward" counter would have a bit depth higher than the integer part of $\log_2$ (j). The N-bit up-counter according to one or more embodiments may have a bit depth equal to or lower than the integer part of $\log_2$ (j).

By way of example, in one or more embodiments the N-bit up-counter may be a 5-bit counter. In another example, the N-bit up-counter may be a 4-bit counter. In another example, the N-bit up-counter may be a 3-bit counter. In another example, the N-bit up-counter may be a 2-bit counter. In certain embodiments, wherein the expected number of faults is low, the N-bit up-counter may be a 1-bit counter.

The internal counter value may be stored in a register readable by bus access. The register may not be writable by bus access.

Implementation of the N-bit up-counter with a low number of bits (e.g., any integer lower than or equal to 5) may result in low silicon footprint and reduced complexity of the counter circuit, and/or of the comparator circuit(s).

As a result of a mismatch between the expected and actual number of received frames being detected, one or more countermeasures may be taken. For instance, a flag signal indicative of a potential problem or failure may be set, and/or the receiving device D may be set (e.g., forced) into a fail-safe mode. Generally, the frame count value may be read via the communication bus B (e.g., by a master device coupled to the bus B).

Figure 2:
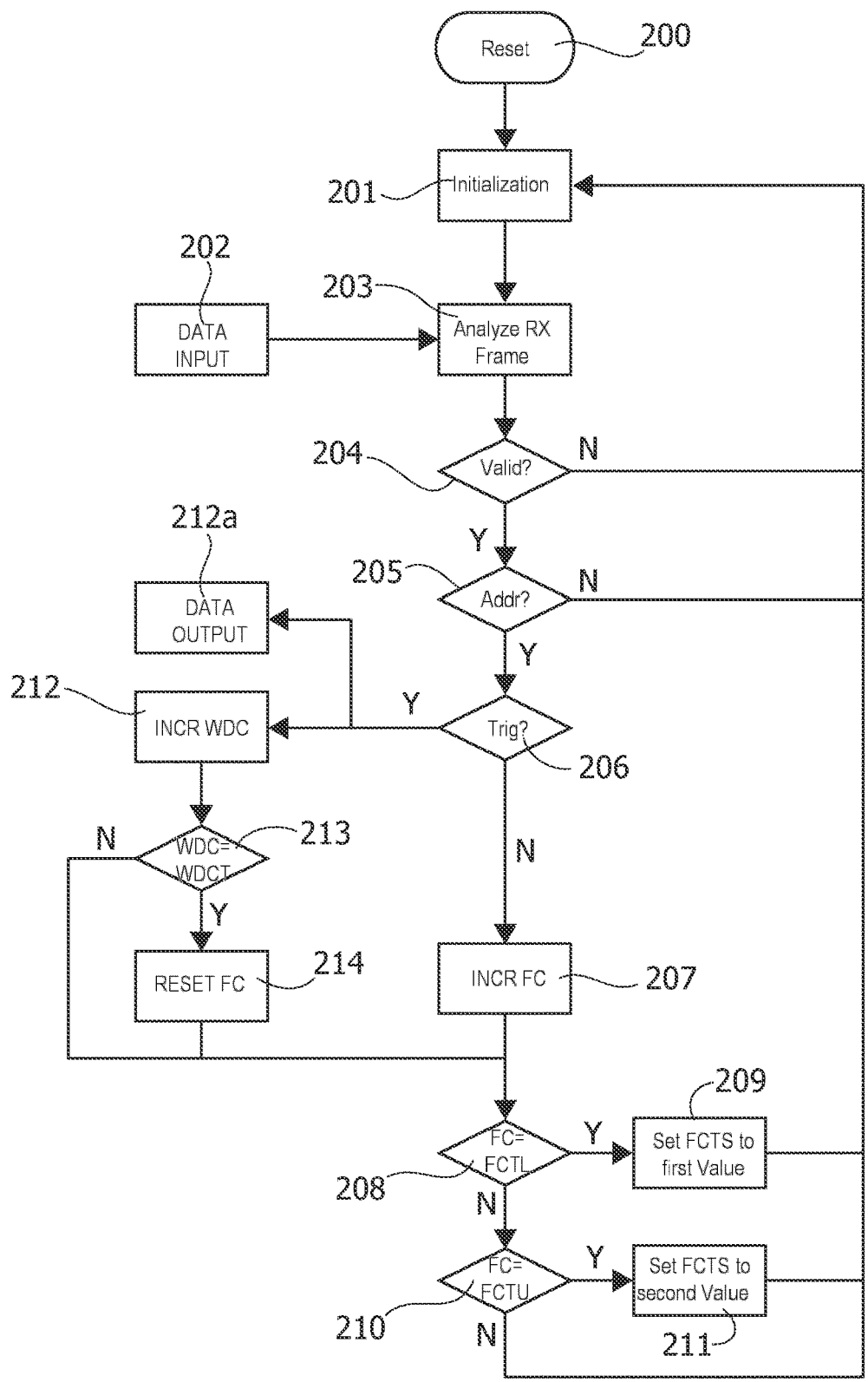
FIG. 2 is a block diagram exemplary of possible operation of one or more embodiments.

In one or more embodiments, the frame counter circuit 107 may thus be configured to operate according to the exemplary operation flow illustrated in FIG. 2.

At a reset step 200, the frame counter circuit 107 may be reset. Therefore: the internal frame counter FC (e.g., a 5-bit value, a 4-bit value, a 3-bit value, a 2-bit value or even a 1-bit value) may be set to zero; the frame counter status output value FCTS (e.g., a 1-bit value) indicative of the current status of the frame counter circuit 107 may be set to zero; the lower counter threshold FCTL, having the same number of bits of the frame counter FC, may be set to zero; the upper counter threshold FCTU, having the same number of bits of the frame counter FC, may be set to zero; the watchdog counter WDC (e.g., a 3-bit value) may be set to zero; and the watchdog threshold WDCT, having the same number of bits of the watchdog counter WDC, may be set to zero.

At an initialization step 201, the values of the lower counter threshold FCTL, the upper counter threshold FCTU and the watchdog threshold WDCT may be initialized by reading them from a device memory. For instance, such a device memory may be a writable memory configured to be written as a result of receiving a dedicated frame or message.

At a step 203, the device D may be waiting for incoming data (e.g., an incoming frame) to be received over the communication bus B. Reception of a frame is exemplified by the data input block 202. Once a frame is received, step 203 may comprise analyzing the received frame. For instance, the received frame may be encoded according to a CAN FD format, and frame analysis performed at step 203 may include check of CRC, bit stuffing, etc.

As exemplified in FIG. 2, the initialization step 201 may be performed before receiving a watchdog trigger (i.e., a toggle event of the watchdog bit), and/or before analyzing a next frame. Thus, in one or more embodiments the values of the lower counter threshold FCTL, the upper counter threshold FCTU and the watchdog threshold WDCT may be updated before they are evaluated.

At a step 204, it may be determined, based on the outcome of the analysis step 203, whether the received frame is a valid frame (positive outcome, Y, of block 204) or not (negative outcome, N, of block 204).

As a result of a negative outcome of step 204, the frame counter circuit 107 may not undertake any action, and operation may continue from step 201, i.e., device D may update the values of the thresholds FCTL, FCTU, WDCT and then continue to wait for frames from the bus B.

As a result of a positive outcome of step 204, operation may continue with step 205, which may comprise determining whether the received frame is addressed to the receiving device D (positive outcome, Y, of block 205) or not (negative outcome, N, of block 205).

As a result of a negative outcome of step 205, the frame counter circuit 107 may not undertake any action, and operation may continue from step 201, i.e., device D may update the values of the thresholds FCTL, FCTU, WDCT and then continue to wait for frames from the bus B.

As a result of a positive outcome of step 205, operation may continue with step 206, where it may be determined whether a watchdog trigger was received at device D (positive outcome, Y, of block 206) or not (negative outcome, N, of block 206).

As a result of a negative outcome of step 206, operation may continue with step 207, which may comprise increasing the value FC of the frame counter (e.g., by one unit).

At a following step 208, it may be checked whether the current value of the frame counter FC is equal to the lower counter threshold FCTL (positive outcome, Y, of block 208) or not (negative outcome, N, of block 208).

As a result of a positive outcome of step 208, the frame counter status output value FCTS may be set (at step 209) to a first value (e.g., 1) indicative of the fact that the number of received frames is within the range of frames expected to be received during the monitoring interval. After setting the frame counter status output value FCTS to the first value, operation may continue from step 201.

As a result of a negative outcome of step 208, operation may continue with step 210, which may comprise checking whether the current value of the frame counter FC is equal to the upper counter threshold FCTU (positive outcome, Y, of block 210) or not (negative outcome, N, of block 210).

As a result of a positive outcome of step 210, the frame counter status output value FCTS may be set (at step 211) to a second value (e.g., 0) indicative of the fact that the number of received frames is not within the range of frames expected to be received during the monitoring interval. After setting the frame counter status output value FCTS to the second value, operation may continue from step 201.

As a result of a negative outcome of step 210, the frame counter circuit 107 may not undertake any action, and operation may continue from step 201.

As a result of a positive outcome of step 206, operation may continue with step 212, which may comprise increasing the value WDC of the watchdog counter (e.g., by one unit).

Additionally, as a result of a positive outcome of step 206, the device D may transmit a frame (e.g., an SPI frame) to communicate the current value of the frame counter status output FCTS, e.g., to a master device coupled to the bus B. This operation is schematically exemplified by the data output block 212a of FIG. 2.

Alternatively, the device D may transmit such a frame comprising the current value of the frame counter status output FCTS only as a result of the watchdog counter WDC being equal to the watchdog threshold WDCT.

After step 212, operation may continue with a following step 213, which comprises checking whether the current value of the watchdog counter WDC is equal to the watchdog threshold WDCT (positive outcome, Y, of block 213) or not (negative outcome, N, of block 213).

As a result of a negative outcome of step 213, operation may continue from step 208.

As a result of a positive outcome of step 213, operation may continue with step 214, which may comprise resetting the value of the frame counter FC, the value of the frame counter status output value FCTS, and the value of the watchdog counter WDC.

After step 214, operation may continue with step 208. Alternatively, after step 214 operation may continue with step 201.

Generally, as a result of steps 204 and 205, (all) valid frames addressed to the device D are counted.

For instance, receiving one of the following frames may result in an increase of the frame counter value FC: unicast frames addressed to the device D, broadcast frames having a chain ID which matches with the chain ID of device D, and are thus addressed to device D, and chain initialization frames.

On the other hand, as a result of steps 204 and 205, receiving one of the following frames may not result in an increase of the frame counter value FC: frames with errors, unicast frames addressed to another device coupled to the bus B (different from device D), broadcast frames having a chain ID which does not match with the chain ID of device D and are thus not addressed to device D, wake-up frames, and synchronization frames.

In one or more embodiments, the value of the frame counter status output FCTS at the end of a monitoring interval (i.e., at the time of a watchdog trigger which causes reset of the frame counter FC and of the watchdog counter WDC) may be used to force the device D to a fail-safe mode. This may be obtained, for instance, in two different ways.

According to a first option, a master device coupled to the bus B and able to read the value of the frame counter status output FCTS may send a command to force device D into a fail-safe mode.

According to a second option, the device D may be provided with a watchdog timer, i.e., a timer which is expected to be periodically reset to zero in order to indicate correct operation of the device. In such case, the device D may be configured to switch to a fail-safe mode as a result of the watchdog timer reaching a certain threshold value. Therefore, one or more embodiments may be configured to prevent resetting the watchdog timer (which in turn would result in the device D switching to the fail-safe mode at expiration of the watchdog timer) as a result of the frame counter status output value FCTS being indicative of a possible communication issue.

In one or more embodiments, the first option or the second option to force the device D in a fail-safe mode may be selected by means of a configuration bit in a non-volatile memory (NVM) in the device D.

One or more embodiments may thus provide functional safety in a communication network by facilitating detection of:

repetition of information (insofar as the frame counter circuit counts the received messages including broadcast messages addressed to the device D; in case the number of received messages is higher than the number of expected messages, repetition may be detected);

loss of information (insofar as the frame counter circuit counts the received messages including broadcast messages addressed to the device D; in case the number of received messages is lower than the number of expected messages, loss of information may be detected);

delay of information (e.g., in case the number of counted messages at a certain frame counter reset instant is lower than expected and at a subsequent instant, such as a frame counter reset instant, it is higher than expected; this condition may be indicative of the fact that either information is lost in a first monitoring interval and repeated in a subsequent second monitoring interval, or that information is delayed from one monitoring interval to the next one);

insertion of information (which may be detected in the same way as repetition of information);

masquerade or incorrect addressing of information (insofar as incorrectly addressed frames may cause one device in the network to receive more frames than expected and another device in the network to receive less frames than expected);

incorrect sequence of information (e.g., by reading back the frame counter content immediately after the frame has been sent; the expected frame counter content is compared to the real frame counter content belonging to this message, and an incorrect sequence may be detected in case the message counter content does not match with the expected value);

corruption of information (insofar as corruption of information is detected by a non-matching CRC value, which causes the incoming frame being dropped and not counted since it is classified as invalid; as a result, the frame counter value may be lower than expected and a corrupted frame may be detected);

asymmetric information sent from a sender to multiple receivers (e.g., insofar as in CAN FD Light networks every message may be addressed to a dedicated receiver; addressing to multiple receivers may be caused either by a corrupted frame or by an incorrectly operating receiver device which takes messages not addressed to it; in the former case, a corrupted frame may be detected by a CRC mismatch, while in the latter case, incorrect operation of the receiver device may be detected since the corresponding frame counter has a value higher than expected);

information from a sender received by only a subset of the intended receivers (insofar as the devices which did not receive a message intended for them may have a frame counter value which is lower than expected; therefore, a similar detection as for the "loss of information" case may take place); and/or blocking access to a communication channel (frames that are not received by the receivers are not counter and the corresponding frame counter value does not match the expected value; if the master sends a unicast message and it does not receive an answer, the block of the communication channel may be also detected; if the unicast frame toggling the watchdog is blocked, the watchdog is not operated and the device may eventually enter a fail-safe state).

As exemplified herein, an electronic device (e.g., D) may be configured for coupling (e.g., TC) to a communication bus (e.g., B) to receive therefrom digital signals arranged in frames comprising frames encoded according to a certain communication protocol. The electronic device may include: a check circuit sensitive to the digital signals arranged in frames, the check circuit configured to perform a check (e.g., 203, 204, 205) as to whether a received frame is encoded according to the communication protocol and is addressed to the electronic device; a frame counter circuit configured to produce a frame count value which is a function of a number of frames received during a monitoring time interval, the frame counter circuit coupled to the check circuit and configured to increase the frame count value as a result of a positive outcome of the check; a comparator circuit configured to: compare (e.g., 208) the frame count value against a first frame count threshold value and, as a result of the frame count value being equal to the first frame count threshold value, set a frame counter status bit to a first value indicative of a first (e.g., normal) operating status of the electronic device, compare (e.g., 210) the frame count value against a second frame count threshold value different from the first frame count threshold value and, as a result of the frame count value being equal to the second frame count threshold value, set the frame counter status bit to a second value indicative of a second (e.g., abnormal) operating status of the electronic device; and a controller circuit (e.g., 10) configured to transmit (e.g., 212*a*) over the communication bus a frame comprising the frame counter status bit and to reset (e.g., 214) the frame count value at the end of the monitoring time interval. In some embodiments, the controller circuit may further reset the frame counter status bit at the end of the monitoring time interval.

As exemplified herein, the frame counter circuit may comprise a modular arithmetic counter circuit (e.g., an up-counter without carry bit) having a certain bit depth, and the frame count value may be constrained to a modulus value of the modular arithmetic counter circuit.

As exemplified herein, the electronic device may be configured to receive a number j of frames during the monitoring time interval, and the modular arithmetic counter circuit may have a non-zero bit depth equal to or lower than the integer part of $\log_2$ (j).

As exemplified herein, the comparator circuit may have a bit depth equal to the bit depth of the modular arithmetic counter circuit.

As exemplified herein, the modular arithmetic counter circuit may have a non-zero bit depth equal to five or less, preferably a bit depth equal to three, more preferably a bit depth equal to one.

As exemplified herein, an electronic device may comprise at least one register configured to store the first frame count threshold value and the second frame count threshold value, the at least one register being accessible via the communication bus in read mode and write mode.

As exemplified herein, an electronic device may comprise watchdog sensing circuitry configured to sense watchdog events occurring at certain time intervals and comprising a watchdog event counter circuit configured to provide a watchdog count value of sensed watchdog events. The watchdog sensing circuitry may be configured to produce, as a result of a watchdog event being sensed: transmission over the communication bus of a frame comprising the frame counter status bit, an increase in the watchdog count value, and comparison (e.g., 213) of the watchdog count value to a watchdog count threshold value and, as a result of the watchdog count value being equal to the watchdog count threshold value, a reset of the frame count value, and of the watchdog count value. The watchdog sensing circuitry may also perform a reset of the frame counter status bit as a result of the watchdog count value being equal to the watchdog count threshold value.

As exemplified herein, an electronic device may comprise at least one register configured to store the watchdog count threshold value, the at least one register being accessible via the communication bus in read mode and write mode.

As exemplified herein, an electronic device may comprise an oscillator circuit (e.g., 106) configured to generate the watchdog events at regular time intervals.

As exemplified herein, sensing watchdog events occurring at certain time intervals may comprise receiving watchdog frames via the communication bus at regular time intervals.

As exemplified herein, a controller circuit may be configured to reset the frame count value and the frame counter status bit as a result of receiving a reset command frame via the communication bus.

As exemplified herein, a controller circuit may be configured to switch the electronic device to a fail-safe operating mode as a result of the frame counter status bit having the second value indicative of a second (e.g., abnormal) operating status of the electronic device at the end of the monitoring time interval.

As exemplified herein, an electronic device may be configured for coupling to a CAN communication bus to receive therefrom digital signals arranged in frames comprising frames encoded according to a CAN FD communication protocol. The electronic device may comprise an application-specific integrated circuit configured for controlling communication over the CAN communication bus. The application-specific integrated circuit may comprise the check circuit, the frame counter circuit, the comparator circuit and the controller circuit integrated therein. The application-specific integrated circuit may be a monolithic integrated circuit comprising a silicon substrate.

As exemplified herein, a system may comprise a communication bus, at least one electronic device according to one or more embodiments coupled to the communication bus, and a further electronic device coupled to the communication bus and configured to send over the communication bus frames addressed to the at least one electronic device.

As exemplified herein, a vehicle (e.g., V) may comprise a system according to one or more embodiments.

Without prejudice to the underlying principles, the details and embodiments may vary, even significantly, with respect to what has been described by way of example only, without departing from the extent of protection.

The invention claimed is:

1. An electronic device configured to be coupled to a communication bus to receive therefrom digital signals arranged in frames comprising frames encoded according to a particular communication protocol, the electronic device comprising:

a comparator circuit configured to, during a monitoring time interval:
compare a frame count value to a first frame count threshold value and, as a result of the frame count value being equal to the first frame count threshold value, set a frame counter status bit to a first value indicative of a first operating status of the electronic device, wherein the frame count value is a function of a number of frames received during the monitoring time interval that are encoded according to the communication protocol and are addressed to the electronic device, and
compare the frame count value to a second frame count threshold value different from the first frame count threshold value and, as a result of the frame count value being equal to the second frame count threshold value, set the frame counter status bit to a second value indicative of a second operating status of the electronic device, wherein the frame counter status bit is set to either the first value based on comparing the frame count value to the first frame count threshold value or to the second value based on comparing the frame count value to the second frame count threshold; and
a controller circuit configured to transmit over the communication bus a frame comprising the frame counter status bit at an end of the monitoring time interval, and to reset the frame count value at the end of the monitoring time interval.

2. The electronic device of claim 1, wherein the electronic device further comprises:
a frame counter circuit configured to produce the frame count value and comprising a modular arithmetic counter circuit having a certain bit depth.

3. The electronic device of claim 2, wherein the electronic device is configured to receive a number j of frames during the monitoring time interval, and the modular arithmetic counter circuit has a non-zero bit depth equal to or lower than an integer part of $\log_2(j)$.

4. The electronic device of claim 2, wherein the comparator circuit has a bit depth equal to the certain bit depth of the modular arithmetic counter circuit.

5. The electronic device of claim 1, further comprising at least one register configured to store the first frame count threshold value and the second frame count threshold value, wherein the at least one register is accessible via the communication bus in read mode and write mode.

6. The electronic device of claim 1, further comprising watchdog sensing circuitry configured to sense watchdog events occurring at certain time intervals and comprising a watchdog event counter circuit configured to provide a watchdog count value of sensed watchdog events, wherein the watchdog sensing circuitry is configured to produce, as a result of a watchdog event being sensed:
a transmission over the communication bus of a frame comprising the frame counter status bit,
an increase in the watchdog count value,
a comparison of the watchdog count value to a watchdog count threshold value, and
as a result of the watchdog count value being equal to the watchdog count threshold value, a reset of the frame count value and of the watchdog count value.

7. The electronic device of claim 6, comprising at least one register configured to store the watchdog count threshold value, wherein the at least one register is accessible via the communication bus in read mode and write mode.

8. The electronic device of claim 6, comprising an oscillator circuit configured to generate the watchdog events at regular time intervals.

9. The electronic device of claim 6, wherein sensing watchdog events occurring at the certain time intervals comprises receiving watchdog frames via the communication bus at regular time intervals.

10. The electronic device of claim 1, wherein the controller circuit is configured to reset the frame count value as a result of receiving a reset command frame via the communication bus.

11. The electronic device of claim 1, wherein the controller circuit is configured to switch the electronic device to a fail-safe operating mode as a result of the frame counter status bit having the second value indicative of the second operating status of the electronic device at the end of the monitoring time interval.

12. A system comprising:
the communication bus according to claim 1;
at least one electronic device according to claim 1, the at least one electronic device coupled to the communication bus; and
a further electronic device coupled to the communication bus and configured to send over the communication bus frames addressed to the at least one electronic device.

13. A vehicle comprising the system according to claim 12.

14. An integrated circuit comprising:
a receiver configured to be coupled to a communication bus, and to receive a digital signal arranged in frames encoded according to a particular communication protocol;
a comparator circuit configured to, during a monitoring time interval:
compare a frame count value to a first frame count threshold value, wherein the frame count value is a function of a number of frames received during the monitoring time interval that are encoded according to the communication protocol and are addressed to a particular electronic device,
set a frame counter status bit to a first value indicative of a first operating status of the particular electronic device when the frame count value is equal to the first frame count threshold value,
compare the frame count value to a second frame count threshold value different from the first frame count threshold value, and
set the frame counter status bit to a second value indicative of a second operating status of the particular electronic device when the frame count value is equal to the second frame count threshold value, wherein the frame counter status bit is set to either the first value based on comparing the frame count value to the first frame count threshold value or to the second value based on comparing the frame count value to the second frame count threshold; and
a controller circuit configured to transmit a frame comprising the frame counter status bit over the communication bus at an end of the monitoring time interval, and to reset the frame count value at the end of the monitoring time interval.

15. The integrated circuit of claim 14, wherein:
the communication bus is a Controller Area Network (CAN) communication bus; and
the particular communication protocol is a CAN Flexible Data Rate (FD) communication protocol.

16. A method, comprising:
determining whether a frame received from a communication bus is encoded according to a particular communication protocol and is addressed to a particular electronic device;
increasing a frame count value when the frame is encoded according to the particular communication protocol and is addressed to the particular electronic device based on the determination;
during a monitoring time interval:
comparing the frame count value to a first frame count threshold value,
setting a frame counter status bit to a first value indicative of a first operating status of the particular electronic device when the frame count value is equal to the first frame count threshold value,
comparing the frame count value to a second frame count threshold value different from the first frame count threshold value, and setting the frame counter status bit to a second value indicative of a second operating status of the particular electronic device when the frame count value is equal to the second frame count threshold value, wherein the frame counter status bit is set to either the first value based on comparing the frame count value to the first frame count threshold value or to the second value based on comparing the frame count value to the second frame count threshold; and transmitting a frame comprising the frame counter status bit over the communication bus at an end of the monitoring time interval, and resetting the frame count value at the end of the monitoring time interval.

17. The method of claim 16, further comprising:

monitoring watchdog events occurring at certain time intervals; and transmitting a frame comprising the frame counter status bit upon sensing a monitored watchdog event.

18. The method of claim 17, further comprising:

providing a count of the sensed monitored watchdog events; and when the count of the sensed monitored watchdog events reaches a predetermined threshold,
resetting the frame count value, and
resetting the count of the sensed watchdog events.

19. The method of claim 16, further comprising switching the particular electronic device into a fail-safe mode when the frame counter status bit has the second value indicative of the second operating status of the particular electronic device at the end of the monitoring time interval.

20. The method of claim 19, wherein the communication bus is a control bus of a vehicle.

* * * * *